United States Patent
Norsten et al.

(10) Patent No.: US 8,304,076 B2
(45) Date of Patent: Nov. 6, 2012

(54) PARTICLES WITH PHOTOCHROMIC AND LIGHT ABSORBING MATERIAL FOR REIMAGEABLE MEDIUM

(75) Inventors: Tyler Norsten, Oakville (CA); Daryl W Vanbesien, Burlington (CA); Gabriel Iftime, Mississauga (CA); Kentaro Morimitsu, Mississauga (CA); Peter M Kazmaier, Mississauga (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 724 days.

(21) Appl. No.: 12/245,103

(22) Filed: Oct. 3, 2008

(65) Prior Publication Data
US 2010/0086768 A1    Apr. 8, 2010

(51) Int. Cl.
*B32B 5/16*    (2006.01)
(52) U.S. Cl. ............. 428/403; 428/407; 430/270.1
(58) Field of Classification Search ............. 428/403, 428/407; 423/270.1
See application file for complete search history.

(56) References Cited

U.S. PATENT DOCUMENTS

| | | | |
|---|---|---|---|
| 4,879,709 A * | 11/1989 | Clark | 369/284 |
| 6,214,500 B1 * | 4/2001 | Kumacheva et al. | 430/21 |
| 6,525,136 B1 * | 2/2003 | Foucher et al. | 525/88 |
| 6,974,618 B2 * | 12/2005 | Kumacheva et al. | 428/64.1 |
| 7,205,088 B2 | 4/2007 | Iftime et al. | |
| 7,410,750 B2 * | 8/2008 | Chopra et al. | 430/345 |
| 2006/0001944 A1 * | 1/2006 | Chopra et al. | 359/265 |
| 2006/0222972 A1 | 10/2006 | Chopra et al. | |

OTHER PUBLICATIONS

Pu et al., Syntheses and optoelectronic properties of four photochromic dithienylethenes, Tetrahedron 61 (2005) 6623-6629, Available online May 23, 2005.*
Norsten et al., U.S. Appl. No. 11/762,177, filed Jun. 13, 2007, titled "Inkless Reimageable Printing Paper and Method".
Norsten et al., U.S. Appl. No. 12/145,412, filed Jun. 24, 2008, titled "Photochromic Medium With Erase-on-Demand Capability".

* cited by examiner

*Primary Examiner* — Hoa (Holly) Le
(74) *Attorney, Agent, or Firm* — MH2 Technology Law Group LLP

(57) ABSTRACT

Various embodiments provide a plurality of particles and a reimageable medium including the plurality of particles. The plurality of particles can include a binder; a photochromic material; and a light absorbing material. The photochromic material is capable of reversibly converting among a less colored form and a more colored form in response to a pre-determined wavelength scope, where light absorption by the light absorbing material is less than about 50% of light absorption by the less colored form of the photochromic material.

20 Claims, 2 Drawing Sheets

PARTICLES WITH PHOTOCHROMIC AND LIGHT ABSORBING MATERIAL FOR REIMAGEABLE MEDIUM

CROSS-REFERENCE TO RELATED APPLICATIONS

U.S. application Ser. No. 11/762,177, titled "INKLESS REIMAGEABLE PRINTING PAPER AND METHOD," filed Jun. 13, 2007, now U.S. Pat. No. 7,645,558, the disclosure of which is totally incorporated herein by reference.

U.S. application Ser. No. 12/145,412, titled "PHOTOCHROMIC MEDIUM WITH ERASE-ON-DEMAND CAPABILITY," filed Jun. 24, 2008, now U.S. Pat. No. 7,964,271, the disclosure of which is totally incorporated herein by reference.

BACKGROUND OF THE INVENTION

Many paper documents are promptly discarded after being read. Although paper is inexpensive, the quantity of discarded paper documents is enormous and the disposal of these discarded paper documents raises significant cost and environmental issues. A reimageable medium is desirable to reduce the quantity of discarded paper documents. A problem with reimageable media using a photochromic material is the background coloration issue where over time absorption by the photochromic material of ambient light reduces the contrast between the imaged region (also referred to as exposed region) and unimaged region (also referred to as non-exposed region). Therefore, there is a need, addressed by embodiments of the present invention for new approaches to minimize background coloration caused by absorption of ambient light in a reimageable medium.

The following documents provide background information:

Gabriel Iftime et al., U.S. Pat. No. 7,205,088 B2.
Naveen Chopra et al., US Published Application No. 2006/0222972 A1.

SUMMARY OF THE DISCLOSURE

In embodiments, there is provided a plurality of particles comprising: (a) a binder; (b) a photochromic material; and (c) a light absorbing material.

In further embodiments, there is provided a reimageable medium comprising: a plurality of particles including:
(a) a binder;
(b) a photochromic material; and
(c) a light absorbing material.

In other embodiments, there is provided a reimageable medium comprising:
a plurality of particles including:
(a) a binder;
(b) a photochromic material capable of reversibly converting among a less colored form and a more colored form, wherein the less colored form has a light absorption band A that overlaps with a predetermined wavelength scope; and
(c) a light absorbing material exhibiting a light absorption band B that overlaps with the light absorption band A, wherein at the predetermined wavelength scope, light absorption by the light absorbing material is less than the light absorption by the less colored form.

BRIEF DESCRIPTION OF THE DRAWINGS

Other aspects of the present invention will become apparent as the following description proceeds and upon reference to the following figure which represent illustrative embodiments.

Unless otherwise noted, the same reference numeral in different Figures refers to the same or similar feature.

DETAILED DESCRIPTION

The term "image" as used herein can be any marking that a person wishes to view where the "image" can be for example words, a picture, graphics, or a combination thereof.

The phrase "absorption spectrum" refers to light absorption at a range of wavelengths where the light absorption is greater than a minimal amount.

The phrase "light absorption band" refers to one or more ranges of wavelengths in the "absorption spectrum" where the absorption is at a relatively higher level (compared with a "valley" described herein), including in embodiments a "peak" where the absorption is at the maximum amount for that "light absorption band."

A "valley" in light absorption refers to a portion of the absorption spectrum where the absorption is at a relatively lower level (compared with a "light absorption band"). A "valley" is typically adjacent to a "light absorption band."

The term "ambient temperature" refers to a temperature ranging from about 15 to about 30 degrees C.

The present disclosure relates to particles useful for instance in a reimageable medium. The particles include at least three components: (a) a binder; (b) a photochromic material; and (c) a light absorbing material. The three components may be present in the particles in any suitable configuration and concentration.

Figure 1:
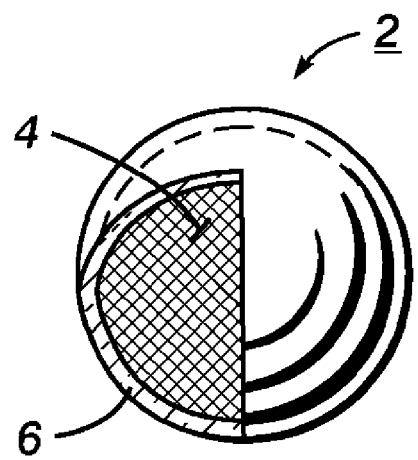
FIG. 1 represents a partial cross-sectional view of one embodiment of the present particles (for convenience, a single particle is depicted).
Figure 2:
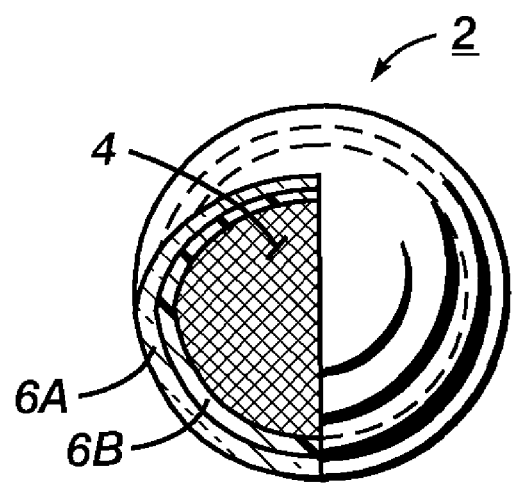
FIG. 2 represents a partial cross-sectional view of another embodiment of the present particles (for convenience, a single particle is depicted).

The particles 2 may have any suitable configuration as seen in for example in FIG. 1 and FIG. 2. In embodiments, the particles comprise a core and a shell (which can be a single shell or two or more shells). In embodiments, as seen for instance in FIG. 1, the shell 6 is a single shell and the photochromic material is present in the core 4 and the light absorbing material is present in the single shell; the same or different binder may be present in the core and the single shell. The concentration of the photochromic material present in the particle core is from about 2 to about 30 or about 3 to about 10 weight percent of the particles. The concentration of the light absorbing material present in the shell of the particle is from about 2 to about 30 or about 3 to about 10 weight percent of the particles.

The preferred method for determining the concentrations of the photochrome and light absorbing material in the particles would be to dissolve a known amount of dried particles in a good solvent for all the components, for example dichloromethane. Analytical techniques such as UV-Vis spectroscopy are then used to determine the concentrations of the photochrome and light absorbing material in solution. This is achieved by known analytical techniques such as comparing the prepared samples to a calibration graph of the pure standards bracketing the concentrations of interest. Proton NMR spectroscopy can also be used as a technique for determining relative concentrations of the photochrome and light absorbing material in the particles. The dried particles are dissolved in a deuterated solvent that dissolves all the components, for example deuterated chloroform. Integration of known peaks of each component are then compared and relative concentrations of all the components are determined.

A core/single shell latex emulsion comprised of polymer particles containing photochromic material and light absorbing material generated from the emulsion polymerization can be prepared as follows. An anionic surfactant solution and de-ionized water is mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of ammonium persulfate initiator and de-ionized water is prepared. Separately a first monomer emulsion is prepared consisting of methyl methacrylate, anionic surfactant, deionized water, and a photochromic compound. A second "shell" monomer solution is prepared consisting of methyl methacrylate, anionic surfactant, deionized water, and a light absorbing compound. 10% by weight of the first monomer solution is slowly fed into the reactor containing the aqueous surfactant phase at 80° C. to form the "seeds" while being purged with nitrogen. The initiator solution is then slowly charged into the reactor and after 10 minutes the rest of the first monomer emulsion is continuously fed in a using metering pump at a rate of 0.5%/min. Once all the first monomer emulsion is charged into the main reactor, the second shell monomer emulsion is continuously fed in a using metering pump at a rate of 0.5%/min. Once all the second shell monomer emulsion is charged into the main reactor, the temperature is held at 80° C. for an additional 2 hours to complete the reaction. Full cooling is then applied and the reactor temperature is reduced to 35° C. The latex particles are then separately dried.

In other embodiments, as seen for example in FIG. 2, the shell comprises an outer shell 6A and an inner shell 6B, and the photochromic material is present in the core 4 or the inner shell 6B, or in both the core and the inner shell, and the light absorbing material is present in the outer shell 6A; the same or different binder may be present in the core, the inner shell, and the outer shell. The concentration of the photochromic material present in the particle core or inner shell or both the core and the inner shell is from about 2 to about 30 or about 3 to about 10 weight percent of the entire particle. The concentration of the light absorbing material present in the outer shell of the particle is from about 2 to about 30 or about 3 to about 10 weight percent of the entire particle.

A core/inner-shell/outer-shell latex emulsion comprised of polymer particles containing photochromic material and light absorbing material generated from the emulsion polymerization can be prepared as follows. An anionic surfactant solution and de-ionized water is mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of ammonium persulfate initiator and de-ionized water is prepared. Separately a first monomer emulsion is prepared consisting of methyl methacrylate, anionic surfactant, and deionized water. A second "inner shell" monomer solution is prepared consisting of methyl methacrylate, anionic surfactant, deionized water, and a photochromic compound. A third "outer shell" monomer solution is prepared consisting of methyl methacrylate, anionic surfactant, deionized water, and a light absorbing compound. 10% by weight of the first monomer solution is slowly fed into the reactor containing the aqueous surfactant phase at 80° C. to form the "seeds" while being purged with nitrogen. The initiator solution is then slowly charged into the reactor and after 10 minutes the rest of the first monomer emulsion is continuously fed in a using metering pump at a rate of 0.5%/min. Once all the first monomer emulsion is charged into the main reactor, the second "inner shell" monomer emulsion is continuously fed in a using metering pump at a rate of 0.5%/min. Once all the second "inner shell" monomer emulsion is charged into the main reactor, the third "outer shell" monomer emulsion is continuously fed in a using metering pump at a rate of 0.5%/min. Once all the third "outer shell" monomer emulsion is charged into the main reactor the temperature is held at 80° C. for an additional 2 hours to complete the reaction. Full cooling is then applied and the reactor temperature is reduced to 35° C. The latex particles are then separately dried.

In further embodiments, the particles lack a core/shell configuration where the photochromic material and the light absorbing material are simply dispersed in the binder. The concentration of the photochromic material present in the particles is from about 2 to about 30 or about 3 to about 10 weight percent of the entire particle. The concentration of the light absorbing material present in particles is from about 2 to about 30 or about 3 to about 10 weight percent of the entire particle.

A latex emulsion comprised of polymer particles containing photochromic material and light absorbing material generated from the emulsion polymerization can be prepared as follows (to make particles lacking a core/shell configuration). An anionic surfactant solution and de-ionized water is mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of ammonium persulfate initiator and de-ionized water is prepared. Separately a monomer emulsion is prepared consisting of methyl methacrylate, anionic surfactant, deionized water, a photochromic compound, and a light absorbing compound. 10% by weight of the monomer solution is slowly fed into the reactor containing the aqueous surfactant phase at 80° C. to form the "seeds" while being purged with nitrogen. The initiator solution is then slowly charged into the reactor and after 10 minutes the rest of the monomer emulsion is continuously fed in a using metering pump at a rate of 0.5%/min. Once all the monomer emulsion is charged into the main reactor, the temperature is held at 80° C. for an additional 2 hours to complete the reaction. Full cooling is then applied and the reactor temperature is reduced to 35° C. The latex particles are then separately dried.

The particles may have any suitable shape such as for instance round and potato-shaped. Representative dimensions of the particles are discussed below:

Particle size range: about 30 nm to about 400 nm or about 40 nm to about 100 nm

Core size: A is defined here as the radius of the particle, the core radius, defined here as B, is about 5% to about 90%, or about 30% to about 70% of A. In embodiments, the core radius is from about 14 nm to about 180 nm.

Single shell thickness: the shell thickness is about 10% to about 95%, or about 30% to about 70% of A. In embodiments, the single shell has a thickness ranging from about 2 nm to about 340 nm.

Inner shell thickness and outer shell thickness: C is defined here as the inner shell thickness and D is defined here as the outer shell thickness. C+D is about 10% to about 95%, or about 30% to about 70% of A. C/D is from about 0.2 to about 4 or about 0.7 to about 1.5. In embodiments, C and D can be any number thickness such that the sum of C+D is from about 2 nm to about 340 nm.

The photochromic material exhibits photochromism which is a reversible transformation of a chemical species induced in one or both directions by absorption of electromagnetic radiation between two forms having different absorption spectra. The first form is thermodynamically stable which can be induced by absorption of light to convert to a second form. The back reaction from the second form to the first form can occur for example thermally or by absorption of light. Embodiments of the photochromic material also encompass the reversible transformation of the chemical species among three or more forms in the event it is possible that reversible transformation can occur among more than two forms. The photochromic material may be composed of one, two, three or more different types of photochromic materials, where the term "type" refers to each family of reversibly interconvertible forms, e.g., spiropyran and and its isomer merocyanine collectively forming one type (also referred to as one family) of photochromic material. Unless otherwise noted, the term "photochromic material" refers to all molecules of the photochromic material regardless of form. For example, where the photochromic material is of a single type such as spiropyran/merocyanine, at any given moment the molecules of the photochromic material may be entirely spiropyran, entirely merocyanine, or a mixture of spiropyran and merocyanine. In embodiments, for each type of photochromic material, one form is colorless or weakly colored (collectively referred herein as "less colored") and the other form is differently colored (also referred herein as "different color" or "more colored").

When two or more types of photochromic materials are present, each type may be present in an equal or unequal amount by weight ranging for example from about 5% to about 90% based on the weight of all types of the photochromic material.

In embodiments, the photochromic material is also thermochromic, i.e., exhibits thermochromism which is a thermally induced reversible color change.

Any suitable photochromic material may be used, especially an organic photochromic material. Examples of suitable photochromic materials include compounds that undergo heterocyclic cleavage, such as spiropyrans and related compounds; compounds that undergo homocyclic cleavage such as hydrazine and aryl disulfide compounds; compounds that undergo cis-trans isomerization such as azo compounds, stilbene compounds and the like; compounds that undergo proton or group transfer phototautomerism such as photochromic quinines; compounds that undergo photochromism via electro transfer such as viologens and the like; and others. Representative photochromic materials are described in Gabriel Iftime et al., U.S. Pat. No. 7,205,088 B2, the disclosure of which is totally incorporated herein by reference.

Specific examples of spiropyrans, spirooxazines, and spirothiopyrans include 1',3'-dihydro-1',3',3'-trimethyl-6-nitrospiro-[2H-1-benzopyran-2,2'-(2H)-indole]; 1',3'-dihydro-1',3',3'-trimethyl-5'-nitrospiro-[2H-1-benzopyran-2,2'-(2H)-indole], 1',3'-dihydro-1',3',3'-trimethyl-6-cyano-spiro-[2H-1-benzopyran-2,2'-(2H)-indole], 1',3'-dihydro-1',3',3'-trimethyl-8-nitrospiro-[2H-1-benzopyran-2,2'-(2H)-indole], 1',3'-dihydro-1',3',3'-trimethyl-6-nitro, 8-methoxy-spiro-[2H-1-benzopyran-2,2'-(2H)-indole], 1',3'-dihydro-1'-decyl-,3',3'-dimethyl-6-nitrospiro-[2H-1-benzopyran-2,2'-(2H)-indole], 1,3-dihydro-1,3,3-trimethylspiro[2H-indole-2,3'-[3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine], 1,3-dihydro-1,3,3-trimethyl-5,6'-dinitro-spiro[2H-indole-2,3'-[3H]naphth[2,1-b]-[1,4]oxazine], 1,3-dihydro-1,3,3-trimethyl-5-methoxy, 5'-methoxy-spiro[2H-indole-2,3'-[3H]naphth[2,1-b]-[1,4]oxazine], 1,3-dihydro-1-ethyl-3,3-dimethyl-5'-nitrospiro[2H-indole-2,3'-[3H]naphth[2,1-b]-[1,4]oxazine], 1,3',3'-trimethylspiro[2H-1-benzothiopyran-2,2'-indoline].

Accordingly, the substituted diarylethenes suitable for use in embodiments are those that can be represented by the following general formulas:

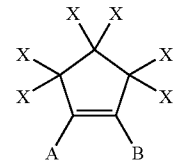

[I]

In formula [I], X independently represents H; a halogen such as chlorine, fluorine, bromine, or the like; a straight or branched, substituted or unsubstituted, alkyl group of from 1 to about 20 or to about 40 carbon atoms, such as methyl, ethyl, propyl, butyl, or the like, where the substitutions can include halogen atoms, hetero atoms (such as oxygen groups, nitrogen groups, and the like), and the like.

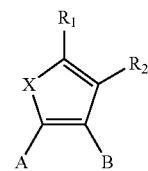

[II]

In formula [II], X represents S or O.

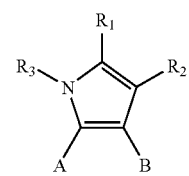

[III]

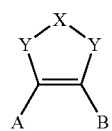

[IV]

In formula [IV], X represents S, O or C=O, Y represents O, $CH_2$ or C=O.

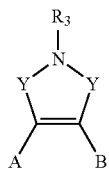

[V]

In formula [V], Y represents $CH_2$ or C=O.

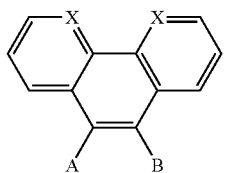

[VI]

In formula [VI], X represents CH or N.

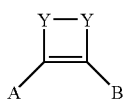

[VII]

In formula [VII], Y represents CH$_2$ or C=O.

In the general formulas [I]-[VII], $R_1$, $R_2$, and $R_3$ are each independently selected from an alkyl group, including substituted alkyl groups, unsubstituted alkyl groups, linear alkyl groups, and branched alkyl groups, and wherein hetero atoms such as oxygen, nitrogen, sulfur, silicon, phosphorus, boron, and the like either may or may not be present in the alkyl group, a halogen group, an alkoxy group, a cyano group, a nitro group, an amino group, an amide group, an aryl group, an alkylaryl group, including substituted alkylaryl groups, unsubstituted alkylaryl groups, and wherein hetero atoms either may or may not be present in the alkyl portion of the alkylaryl group or the aryl portion of the alkylaryl group; A represents substituents [a] or [b] or [c], and B represents substituents [d] or [e] or [f] shown below,

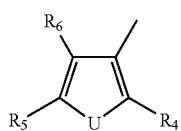

[a]

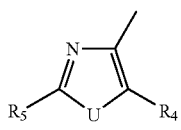

[b]

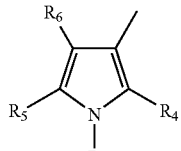

[c]

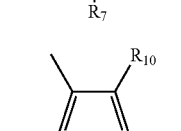

[d]

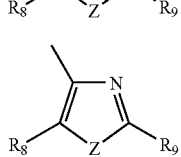

[e]

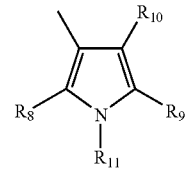

[f]

In substituents [a]-[c], $R_4$ represents a straight, branched or cyclic, substituted or unsubstituted, alkyl group of from 1 to about 20 or about 40 carbon atoms, such as methyl, ethyl, propyl, butyl, isopropyl, cyclohexyl, isoborneol or the like, an aryloxy group including phenyl, naphthyl and the like and substituted and unsubstituted heteroaromatic group, an alkoxy group or substituted alkoxy group where the alkyl portion of the alkoxy group represents a straight, branched or cyclic, substituted or unsubstituted, alkyl group of from 1 to about 20 or about 40 carbon atoms, such as methyl, ethyl, propyl, butyl, isopropyl, cyclohexyl, isoborneol or the like, where the substitutions can include halogen atoms, hetero atoms (such as oxygen groups, nitrogen groups, and the like), and the like; $R_5$ represents an aryl group, or an alkylaryl group including substituted alkylaryl groups, unsubstituted alkylaryl groups, and wherein hetero atoms either may or may not be present in the alkyl portion of the alkylaryl group or the aryl portion of the alkylaryl, a cyano group, a carboxylic acid group or an unsaturated alkene group; $R_6$ represents a hydrogen atom, an alkyl group, a halogen atom, and alkoxy group, a fluoroalkyl group, a cyano group, an aryl group, or a substituted alkylaryl group; $R_7$ represents an alkyl group and aryl group, or an alkylaryl group including substituted alkylaryl groups, unsubstituted alkylaryl groups, and wherein hetero atoms either may or may not be present in the alkyl portion of the alkylaryl group or the aryl portion of the alkylaryl; and U represents O or S.

In substituents [d]-[f], $R_8$ represents a straight, branched or cyclic, substituted or unsubstituted, alkyl group of from 1 to about 20 or about 40 carbon atoms, such as methyl, ethyl, propyl, butyl, isopropyl, cyclohexyl, isoborneol or the like, an aryloxy group including phenyl, napthyl and the like, and substituted and unsubstituted heteroaromatic group, or an alkoxy group or substituted alkoxy group where the alkyl portion of the alkoxy group represents a straight, branched or cyclic, substituted or unsubstituted, alkyl group of from 1 to about 20 or about 40 carbon atoms, such as methyl, ethyl, propyl, butyl, isopropyl, cyclohexyl, isoborneol or the like, where the substitutions can include halogen atoms, hetero atoms (such as oxygen groups, nitrogen groups, and the like), and the like; $R_9$ represents an aryl group, or an alkylaryl group including substituted alkylaryl groups, unsubstituted alkylaryl groups, and wherein hetero atoms either may or may not be present in the alkyl portion of the alkylaryl group or the aryl portion of the alkylaryl, a cyano group, a carboxylic acid group or an unsaturated alkene group; $R_{10}$ represents a hydrogen atom, an alkyl group, a halogen atom, and alkoxy group, a fluoroalkyl group, a cyano group, an aryl group, or a substituted alkylaryl group; $R_{11}$ represents an alkyl group and aryl group, or an alkylaryl group including substituted alkylaryl groups, unsubstituted alkylaryl groups, and wherein hetero atoms either may or may not be present in the alkyl portion of the alkylaryl group or the aryl portion of the alkylaryl; and Z represents O or S.

In certain embodiments, the substituted diarylethenes of formulas [I]-[VII] are those compounds where $R_4$ and $R_8$ are the same alkoxy containing substituents. In these embodiments the alkyl or substituted alkyl groups contain 4 or more carbon atoms. This is in certain embodiments a requirement for adequate thermal-based cycloreversion reaction times. In other embodiments, however, the alkoxy substituents of $R_4$ and $R_8$ can be different alkoxy substituents. In this case, either at least one or both of the alkoxy groups may contain 4 or more carbon atoms.

In embodiments, 2-aryl alkoxy containing diarylethenes are more stable in their colored states than other substituted diarylethenes, such as alkyl substituted diarylethenes, to visible light for longer periods of time. At the same time, the alkoxy substitution lowers the barrier to thermal de-colorization, or the reverse isomerization from the colored state back to the colorless state. These are important attributes for reimageable media, and have been found to be very specific to the alkoxy containing dithienylethene class of photochromes. For example, for some users, particularly those concerned with security of the information left unattended, self-erasing of a reimageable document in about a day is beneficial. However, for other users, self-erasing is a disadvantage because the users do not have control over the erasing time/rate. These latter users would prefer an "erase-on-demand" type of reusable document, where the document displays the printed image for as long as needed (for example, for several days to several weeks or more), then when the user decides, the information is erased during the re-printing process with new information on the same medium.

A particular advantage of alkoxy modified diarylethenes is that suitable selection of the alkoxy substituent can allow for specific tuning of the barrier to thermal erase. For example, the barrier to thermal erasing can be tuned to be rapid and complete at elevated temperatures (such as about 80 to about 160° C.) while maintaining long-term thermal-based color stability at ambient temperatures (such as about 25 to about 70° C.) based on the structure of the alkoxy R-group substituent. Based on thermal and spectroscopic analysis, the half-life thermal stability of specific compounds can be predicted to range from approximately 2.2 hours at 30° C. for the least thermally stable tert-butyl compound (See: Chemistry Letters, 2002, pp. 572-573) to 420 years at 30° C. for the methoxy compound.

Accordingly, in some embodiments, the alkoxy modified dithienylethene photochromic material can be readily converted from its colored state to its colorless state by exposure to suitable irradiation, such as visible light, alone. However, in other embodiments, the alkoxy modified dithienylethene photochromic material can be readily converted from its colored state to its colorless state by exposure to suitable irradiation, such as visible light, in combination with heat, or by exposure to heat alone. By "readily converted" herein is meant that the photochromic material as prepared can be converted from its colored state to its colorless state in a period of less than about 30 minutes, less than about 10 minutes, less than about 1 minute, or less than about 30 seconds of exposure time to the suitable conversion means of heat and/or light. In contrast, by "not readily converted" herein is meant that the photochromic material converts from its colored state to its colorless state in a period of more than 30 minutes, of exposure time to the suitable conversion means of heat and/or light. For example, in some embodiments where heat is used as the activator for the conversion, heating of the photochromic material at temperatures of from about 80 to about 250° C., such as from about 100 to about 200° C. or about 100 to about 160° C., can readily convert the photochromic material from the colored state back to the colorless state in the above time periods, while heating of the photochromic material at temperatures of from about 25 to about 70° C. does not readily convert the photochromic material from the colored state back to the colorless state.

These photochromic materials are thus different from other photochromic materials, including other differently substituted or unsubstituted dithienylethenes, in that the materials are generally not readily convertible back from the colored state to the colorless state by exposure to visible light alone, but require exposure to appropriate heating, with or without visible light in order to convert back from the colored state to the colorless state. This allows for a desirable product because the colored state can be frozen until sufficient heat beyond that of ambient heat induces enough molecular and lattice mobility to allow the structural reorganization to occur. In addition, in embodiments, the photochromic material requires only application of heat, and not light stimulus, to cause the photochromic material to switch between the colored and colorless states.

The photochromic material may be a mono-alkoxy substituted diarylethene (DAE) represented by 3-(3,3,4,4,5,5-hexafluoro-2-(2-methoxy-5-phenylthiophen-3-yl)cyclopent-1-enyl)-2-methyl-5-phenylthiophene:

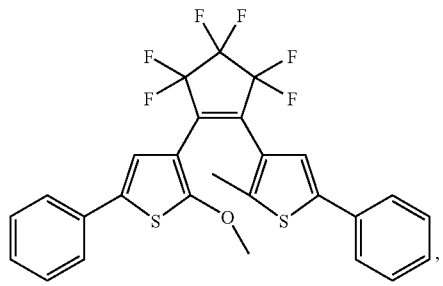

The photochromic material may be a di-alkoxy substituted diarylethene (DAE) represented by 3,3'-(perfluorocyclopent-1-ene-1,2-diyl)bis(2-(cyclohexyloxy)-5-phenylthiophene):

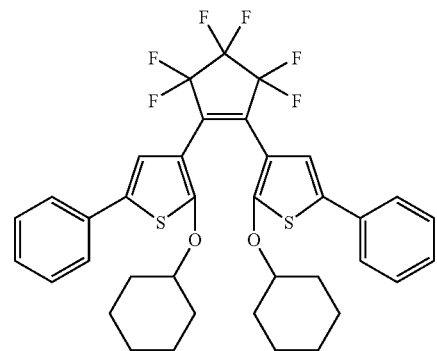

The photochromic material may be a spiropyran-based photochromic material represented by:

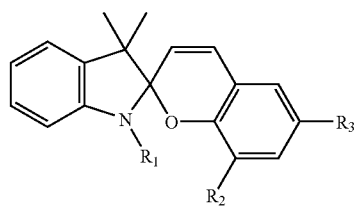

wherein $R_1$, $R_2$ and $R_2$ are each independently selected from a hydrogen atom, an alkyl group, including substituted alkyl groups, unsubstituted alkyl groups, linear alkyl groups, and branched alkyl groups, and wherein hetero atoms such as oxygen, nitrogen, sulfur, silicon, phosphorus, boron, and the like either may or may not be present in the alkyl group, a halogen group, an alkoxy group, a cyano group, a nitro group, an amino group, an amide group, an ester group, an aryl group, an alkylaryl group, including substituted alkylaryl groups, unsubstituted alkylaryl groups, and wherein hetero atoms either may or may not be present in the alkyl portion of the alkylaryl group or the aryl portion of the alkylaryl group.

As discussed herein, the photochromic material can exist in a number of forms which are depicted herein by illustrative structural formulas for each type of photochromic material. For the chemical structures identified herein one form of the photochromic material is typically colorless or weakly colored (e.g., pale yellow) which is referred herein as the "less colored" form; whereas, the other form typically has a different color (e.g., red, blue, or purple) which is also referred herein as the "more colored" form.

In embodiments, there can be three main types of binders used: (1) a binder to make the particles; (2) an optional binder to facilitate coating of the particles onto a substrate; and (3) a film-forming binder for making a film of the binder and the particles such that a separate substrate is rendered optional for the reimageable medium. For these three main types of binders, the same or different binder(s) may be used. Unless otherwise indicated, the discussion herein for the binder is generally applicable for the three main types of binders.

The role of the binder is that of a suspending medium to hold the photochromic material for the purposes described herein. The desired properties of the binder are any or all of the following: mechanical characteristics, robustness, and optical clarity. In embodiments, the binder should not be highly crystalline or light scattering so that the imaging light can image the photochromic material, and the images are of sufficient contrast. Moreover, in embodiments, the binder is a solid, nonvolatile material that will not be easily removed from a substrate.

Any suitable binder may be used such as a polymer material. Examples of polymer materials that can be used as binders include: polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, and epoxy resins and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers.

Examples of polycarbonates as the binder include: poly(bisphenol-A-carbonate) and polyethercarbonates obtained from the condensation of N,N'-diphenyl-N,N'-bis(3-hydroxy phenyl)-[1,1'-biphenyl]-4,4'-diamine and diethylene glycol bischloroformate.

Examples of polystyrenes as the binder include: polystyrene, poly(bromostyrene), poly(chlorostyrene), poly(methoxystyrene), poly(methylstyrene).

Examples of polyolefins as the binder include: polychloroprene, polyethylene, poly(ethylene oxide), polypropylene, polybutadiene, polyisobutylene, polyisoprene, and copolymers of ethylene, including poly(ethylene/acrylic acid), poly(ethylene/ethyl acrylate), poly(ethylene/methacrylic acid), poly(ethylene/propylene), poly(ethylene/vinyl acetate), poly(ethylene/vinyl alcohol), poly(ethylene/maleic anhydride).

Examples of polyacrylates as the binder include: poly(methyl methyacrylate), poly(cyclohexyl methacrylate), poly(n-butyl methacrylate), poly(sec-butyl methacrylate), poly(isobutyl methacrylate), poly(tert-butyl methyacrylate), poly(n-hexyl methacrylate), poly(n-decyl methacrylate), poly(lauryl methacrylate), poly(hexadecyl methacrylate), poly(isobornyl methacrylate), poly(isopropyl methacrylate), poly(isodecyl methacrylate), poly(isooctyl methacrylate), poly(noeopentyl methacrylate), poly(octadecylmethacrylate), poly(octyl methacrylate), poly(n-propyl methacrylate), poly(phenyl methacrylate), poly(n-tridecyl methacrylate), as well as the corresponding acrylate polymers. Other examples include: poly(acrylamide), poly(acrylic acid), poly(acrylonitrile), poly(benzylacrylate), poly(benzylmethacrylate), poly(2-ethylhexyl acrylate), poly(triethylene glycol dimethacrylate). Commercial examples of these materials include acrylic and methacrylic ester polymers such as ACRYLOID™ A10 and ACRYLOID™ B72, polymerized ester derivatives of acrylic and alpha-acrylic acids both supplied by the Rohm and Haas Company, and LUCITE™ 44, LUCITE™ 45 and LUCITE™ 46 polymerized butyl methacrylates supplied by the Du Pont Company.

Examples of polyvinyl derivatives as the binder include: poly(vinyl alcohol), poly(vinyl acetate), poly(vinyl chloride), poly(vinyl butyral), poly(vinyl fluoride), poly(vinyl pyridine), poly(vinyl pyrrolidone), poly(vinyl stearate). Commercially available polyvinyl derivatives include chlorinated rubber such as PARLON™ supplied by the Hercules Powder Company; copolymers of polyvinyl chloride and polyvinyl acetate such as Vinylite VYHH and VMCH manufactured by the Bakelite Corporation; alkyd resins such as GLYPTAL™ 2469 manufactured by the General Electric Co.

Examples of cellulose derivatives as the binder include: cellulose, cellulose acetate, cellulose acetate butyrate, cellulose propionate, cellulose triacetate, ethyl cellulose, hydroxypropyl cellulose, methyl cellulose.

Examples of polyurethanes as the binder include aliphatic and aromatic polyurethanes like NEOREZ™ 966, NEOREZ™ R-9320 and the like, manufactured by NeoResins Inc., copolymers of polyurethanes with polyethers and polycarbonates like THECOTHANE™, CARBOTHANE™, TECHOPHYLIC™ manufactured by Thermadics in Wilmington, Mass. (USA), BAYDUR™ and BAYFIT™, BAYFLEX™ and BAYTEC™ polyurethane polymers manufactured by Bayer.

Examples of polyamides as the binder include: Nylon 6, Nylon 66, TACTEL™ which is a registered mark of DuPont, modified polyamides like ARLEN™ from Mitsui Chemicals and TORLON™.

Examples of polyesters as the binder include: poly(ethylene terephthalate), poly(ethylene napthalate) and the like.

Examples of silicone resins as the binder include: polydimethylsiloxane, DC-801, DC804, and DC-996, all manufactured by the Dow Corning Corp. and SR-82, manufactured by GE Silicones. Other examples of silicone resins include copolymers such as silicone polycarbonates, that can be cast into films from solutions in methylene chloride. Such copolymers are disclosed in U.S. Pat. No. 3,994,988. Other examples of silicone resins include siloxane modified acrylate and methacrylate copolymers described in U.S. Pat. Nos. 3,878,263 and 3,663,650. Methacryl silanes such as COATOSIL™ 1757 silane, SILQUEST™A-174NT, SILQUEST™A-178, and SILQUEST™Y-9936 and vinyl silane materials such as COATOSIL™ 1706, SILQUEST™ A-171, and SILQUEST™A-151 all manufactured by GE-Silicones. Also, solvent-based silicone coatings such as UVHC3000, UVHC8558, and UVHC8559, also manufactured by GE-Silicones. Aminofunctional silicones may be combined with other polymers to create polyurethanes and polyimides. Examples of aminofunctional silicones include DMS-A11, DMS-A12, DMS-A15, DMS-A21, and DMS-A32, manufactured by Gelest Inc. Silicone films can also be prepared via RTV addition cure of vinyl terminated polydimethylsiloxanes, as described by Gelect Inc. The following formulation may be used:

DMS-V31 1000 cSt vinyl terminated polydimethylsiloxane—100 parts;

SIS6962.0 hexamethyldisilazane treated silica—50 parts;

MHS-301 methylhydrosiloxane-dimethylsiloxane copolymer—3 to 4 parts; and

SIP6830.0 platinum complex solution—150 to 200 ppm.

Another example of silicone-based coating binders is a cured elastomer derived from the SYLGARD™ line of silicone materials. Examples of such materials include SYLGARD™ 182 SYLGARD™ 184 and SYLGARD™ 186, available from Dow Coming.

Examples of epoxy resins as the binder include: cycloaliphatic epoxy resins and modified epoxy resins like for example Uvacure 1500 series manufactured by Radcure Inc.; bisphenol-A based epoxy resins like for example D.E.R. 661, D.E.R. 671 and D.E.R. 692H all available at Dow Coming Company. Other examples include aromatic epoxy acrylates like LAROMER™ EA81, LAROMER™ LR 8713 and LAROMER™ LR9019, modified aromatic epoxy acrylate like LAROMER™ LR 9023, all commercially available at BASF.

The binder may be composed of one, two, three or more different binders. When two or more different binders are present, each binder may be present in an equal or unequal amount by weight ranging for example from about 5% to 90%, particularly from about 30% to about 50%, based on the weight of all binders.

The light absorbing material may be composed of one, two or more light absorbing materials. To explain the purpose of the light absorbing material, one first considers that the photochromic material is capable of reversibly converting among a less colored form and a more colored form, wherein the less colored form has a light absorption band A that overlaps with a predetermined wavelength scope. The light absorbing material exhibits a light absorption band B that overlaps with the light absorption band A, wherein at the predetermined wavelength scope, light absorption by the light absorbing material is less than the light absorption by the less colored form.

The light absorbing material is selected based on its absorption spectrum compared with the absorption spectrum of the less colored form of the photochromic material. The less colored form of the photochromic material that is compared with the light absorbing material can be any form of the photochromic material based on for example color or thermodynamic stability. In embodiments, the absorption spectrum of the light absorbing material is compared to the absorption spectrum of the more thermodynamically stable form of the photochromic material where for the representative reversibly interconvertible forms of for example spiropyran and merocyanine, spiropyran is considered the more thermodynamically stable form. The phrase "thermodynamically stable form" refers to the compound which is more stable in the absence of external stimuli. For example, a mixture of spiropyran and its corresponding merocyanine of any ratio between the two forms will evolve to 100% spiropyran if given enough time and the mixture is not exposed to stimuli like light. Spiropyran (closed form) is the more thermodynamically stable form.

Figure 3:
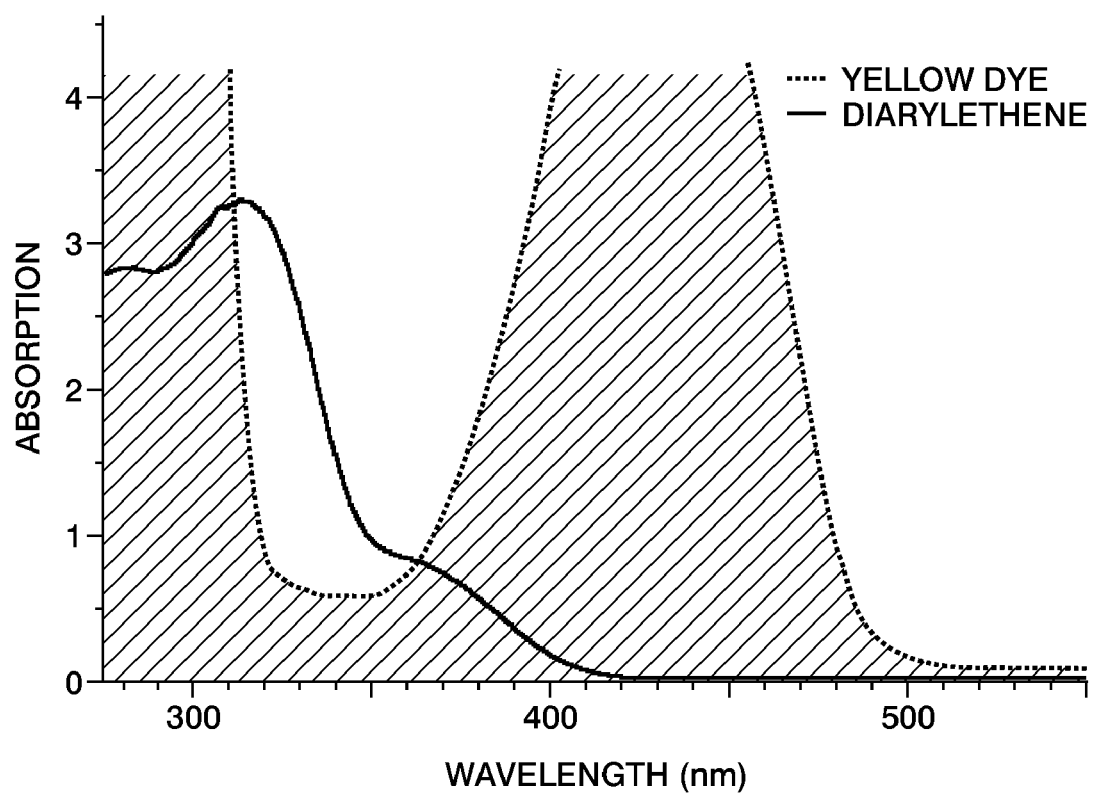
FIG. 3 represents the UV-VIS absorption spectrum of one photochromic material and one light absorbing material.

FIG. 3 illustrates the meaning of "absorption spectrum," "light absorption band," "peak", and "valley" for an unsymmetrical diarylethene (3-(3,3,4,4,5,5-hexafluoro-2-(2-methoxy-5-phenylthiophen-3-yl)cyclopent-1-enyl)-2-methyl-5-phenylthiophene.) and a yellow dye (dodecyl anthranilate dodecyl pyridone) which is the light absorbing material. The unsymmetrical diarylethene photochrome exhibits an "absorption spectrum" ranging from 250 nm to about 400 nm; any minimal absorption of diarylethene from about 400 nm to 500 nm is not considered part of the "absorption spectrum." Within the absorption spectrum of diarylethene, there are two overlapping light absorption bands, a first strong light absorption band ranging from 300 nm to about 350 nm, and a second light absorption band ranging from about 350 nm to about 400 nm. The first light absorption band of diarylethene has an absorption peak at about 320 nm; the second light absorption band of diarylethene has an absorption peak at about 360 nm. In the embodiment where the imaging light has a predetermined wavelength scope of 365 nm, diarylethene has an absorption spectrum that overlaps with the predetermined wavelength scope as seen in FIG. 3. In embodiments, the light absorption band of the one form of the photochromic material overlaps with the predetermined wavelength scope which is illustrated in FIG. 3 where the second light absorption band of diarylethene overlaps with the predetermined wavelength scope of 365 nm.

Yellow dye has two non-overlapping light absorption bands separated by a valley, a first light absorption band ranging from 250 nm to about 320 nm, and a second light absorption band ranging from about 370 nm to about 490 nm. The valley ranges from about 320 nm to about 370 nm and has its lowest absorption centered at about 340 nm. The first light absorption band of yellow dye has an absorption peak at about 280 nm; the second light absorption band of yellow dye has an absorption peak at about 430 nm.

In embodiments, the light absorption bands of the light absorbing material avoid overlap with the predetermined wavelength scope. This is illustrated in FIG. 3 where the two light absorption bands and their absorption peaks of the yellow dye, overlap avoid with the predetermined wavelength scope of 365 nm.

The procedure for generating FIG. 3 is now described. Two film samples were prepared by spin coating procedure of solutions containing yellow dye and diarylethene respectively, each of them dissolved in a 2.5 ml solution of polymethylmethacrylate in tetrahydrofuran. Each sample contained one of the above mentioned yellow dye and diarylethene, in an amount comprised from 40 mg to 90 mg. UV-VIS spectra of the films on quartz substrates were recorded with an UV-VIS spectrophotometer. The recorded absorption spectra are shown together in FIG. 3. It is understood that the values for light absorption may vary with material concentration. But in general the wavelength regions corresponding to "absorption spectrum," "light absorption band," and "absorption peak" is independent of material concentration.

In embodiments, at the predetermined wavelength scope, light absorption by the light absorbing material is in a valley of the light absorption spectrum of the light absorbing material. In further embodiments, at the predetermined wavelength scope, light absorption by the light absorbing material is less than about 50%, or less than about 25%, of the light absorption of the less colored form of the photochromic material. In additional embodiments, the less colored form of the photochromic material is colorless and the light absorbing material comprises a yellow colorant.

In embodiments, there is minimal absorption by the shell of light at the predetermined wavelength scope. For instance, in embodiments, the shell permits transmission of about 20% to 99%, or from about 50% to 99%, of light at the predetermined wavelength scope to the photochromic material. In embodiments, the single shell of FIG. 1 and the outer shell of FIG. 2 are translucent.

In the absence of the light absorbing material, indoor ambient light over a period of time may cause in embodiments the photochromic material in the non-exposed region (that is, not exposed to the imaging light) to undergo the interconversion to the more colored form where the color of the non-exposed region may match or be similar to the color of the exposed region, thereby causing fading or erasure of the image by the reduction in the color contrast. Incorporating the light absorbing material into the reimageable medium reduces or minimizes this problem by slowing down the background coloration of the unimaged region.

Any suitable light absorbing materials can be used. Organic molecules and polymeric materials useful for the light absorbing material, a number of which possess high absorbance above and/or below the predetermined wavelength scope, are now described.

Organic compounds which may be useful for the light absorbing material include 2-hydroxy-phenones, like for example 2,4-diyhdroxyphenone, 2-(2-hydroxy-5-tert-octylphenyl)benzotriazole, 2-hydroxy-4-n-octoxybenzophenone, 2-(2'-hydroxy-3',5'-di-tert-amylphenyl)benzotriazole, azobenzene derivatives like for example azobenzene, 4-ethyl azobenzene, 2-chloro-azobenzene, 4-phenylazobenzene, aromatic conjugated systems possessing:

(a) at least one aromatic ring such as one, two or more aromatic rings having for instance from about 6 carbon atoms to about 40 carbon atoms such as —$C_6H_4$—, and —$C_6H_4$—$C_6H_4$—;

(b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C≡C—$C_6H_4$—; or (c) fused aromatic rings having for instance from about 10 to about 50 carbon atoms such as 1,4-$C_{10}H_6$ and 1,5-$C_{10}H_6$.

Optionally, one or more aromatic rings possess substituents. Such substituents can be for example atoms like N, O, S, where the valence of the atom is satisfied by bonding with H or a hydrocarbon group, aldehyde (—C(O)—H), ketone (—C(O)—R), ester (—COOR), a carboxylic acid (—COOH); cyano (CN); nitro ($NO_2$); nitroso (N=O); a sulfur-based group (e.g., —$SO_2$—$CH_3$; and S—$O_2$—$CF_3$); a fluorine atom; an alkene (—CH=$CR_2$ or —CH=CHR), wherein each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

Specific examples of organic aromatic conjugated compounds, a number of which may absorb below the predetermined wavelength scope, include for example nitro-benzene, 4-methoxy-benzonitrile, anthracene, anthraquinone, 1-chloro-anthracene and the like.

Some of these light absorbing materials are commercially available for example at Mayzo (BLS™531; BLS™5411; BLS™1710), Ciba (TINUV™234, TINUV™ P, TINUV® 1577) and are typically used as UV protective layer to prevent photochemical degradation of polymeric coatings.

Yellow colorants, particularly yellow dyes, useful for the light absorbing material may be used. In embodiments, yellow colorants may possess strong absorption above the predetermined wavelength scope, along with weak or minimal absorption at the predetermined wavelength scope. The yellow colorant may optionally possess a light absorption band below the predetermined wavelength scope. In embodiments, yellow colorants (especially yellow dyes) contain in their light absorption spectrums light absorption bands of various intensities in the region from about 200 nm to 500 nm and absorb very little or not at all above 500 nm. It is the absorption in the region from about 400 nm to 500 nm that is resultant in a yellow color.

Types of illustrative yellow colorants are now discussed. Azo pyridone yellow dyes, as disclosed in U.S. Pat. Nos. 6,673,139; 6,663,703; 6,646,101; and 6,590,082 may be suitable, the disclosures of which are totally incorporated herein by reference. The azo pyridone yellow dyes may possess in embodiments very low absorption below 370 nm but high absorption above this wavelength. These azo pyridone yellow dyes can be comprised of either mono-pyridone and mono-anthranilate; dipyridone and bis anthranilate; or dianthranilate and bis-pyridone. Some examples follow:

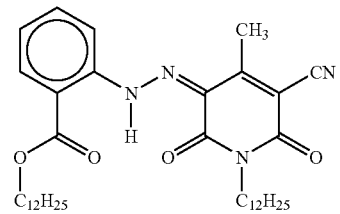

Dodecyl Anthranilate Dodecyl pyridone

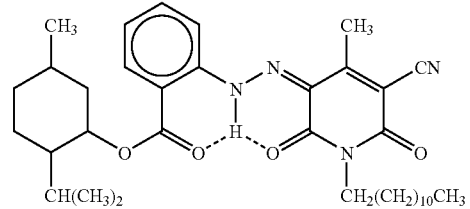

Menthyl Anthranilate Dodecyl Pyridone

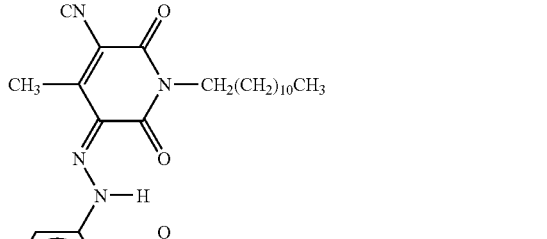

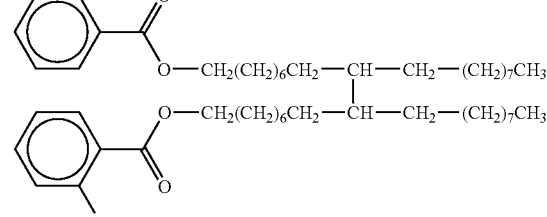

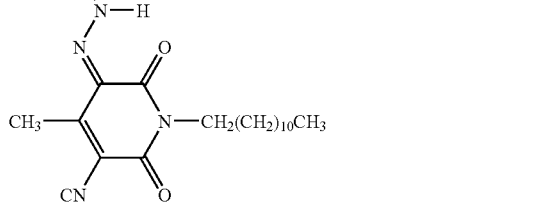

Dimer Diol Dianthranilate Bis(Dodecyl Pyridone)

-continued

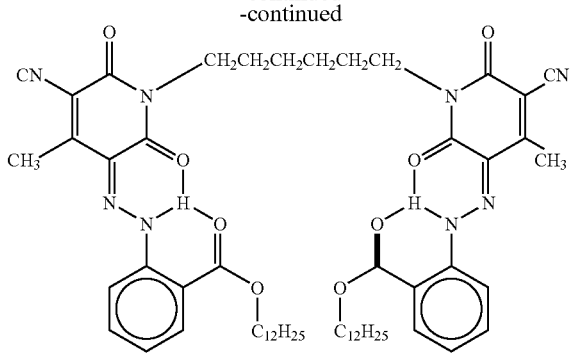

Bis(Dodecyl Anthranilate)Hexamethylene Dipyridone

Suitable yellow colorants include acid yellow dyes, basic yellow dyes, direct yellow dyes, solvent yellow dyes. Many examples of suitable yellow dyes can be found in Color Index, published by the Society of Dyers and Colourists and the American Association of Textile Chemists and Colorists.

Suitable solvent dyes include azo materials like Solvent Yellow 2, Solvent Yellow 14, Sovent Yellow 16 all available from Dayglo Color Corporation; Quinoline deivatives like Solvent Yellow 33 known as Chinoline Yellow from Global Colors Inc. from USA; diphenylmethane compounds like Solvent Yellow 34 available for example from Dayglo Color Corporation. Other solvent yellow dyes include Solvent Yellow 162 from BASF sold under the name of Neptune Gelb 075 as well as dyes commercially available from Keystone Aniline (USA) under the general name of Keyplast Yellow, like Keyplast Yellow 2GC (Solvent Yellow 16), Keyplast Yellow 3G (Solvent Yellow 3G), Keyplast Yellow YC (Solvent Yellow 33), Keyplast Yellow GC (Solvent Yellow 77), Keyplast Yellow 2GH (Solvent Yellow 72). Many other solvent yellow dyes are commercially available.

Other suitable solvent dyes include Azo pyridone yellow dyes, as disclosed in U.S. Pat. Nos. 6,673,139; 6,663,703; 6,646,101; and 6,590,082 may be suitable, the disclosures of which are totally incorporated herein by reference. The azo pyridone yellow dyes may possess in embodiments very low absorption below 370 nm but high absorption above this wavelength. These azo pyridone yellow dyes can be comprised of either mono-pyridone and mono-anthranilate; dipyridone and bis anthranilate; or dianthranilate and bis-pyridone.

In embodiments, a polymeric light absorbing material is used which is composed of an organic moiety (derived from the compounds described herein as being suitable as a light absorbing material) attached to a polymeric backbone. The organic moiety (e.g., azobenzene moiety and azo pyridone moiety) can be part of the polymer backbone of the polymer or the organic moiety can be attached as a side group to the polymer backbone. Suitable examples of the polymeric light absorbing material include substituted polystyrenes, substituted acrylates, substituted methacrylates, substituted polyurethanes, all containing attached or inserted organic moieties as described for the light absorbing organic molecules.

The light absorbing material may be composed of one, two, three or more different light absorbing materials. When two or more different light absorbing materials are present, each light absorbing material may be present in an equal or unequal amount by weight ranging for example from about 5% to 90%, particularly from about 30% to about 50%, based on the weight of all light absorbing materials.

In embodiments, the substrate is made of a flexible material. The substrate can be transparent or opaque. The substrate may be composed of any suitable material such as wood, plastics, paper, fabrics, textile products, polymeric films, inorganic substrates such as metals, and the like. The plastic may be for example a plastic film, such as polyethylene film, polyethylene terepthalate, polyethylene napthalate, polystyrene, polycarbonate, polyethersulfone. The paper may be for example plain papers such as XEROX™ 4024 papers, ruled notebook paper, bond paper, silica coated papers such as Sharp Company silica coated paper, Jujo paper, and the like. The substrate may be a single layer or multi-layer where each layer is the same or different material. The substrate has a thickness ranging for example from about 0.3 mm to about 5 mm.

The substrate/reimageable medium may be rigid or flexible. In fact, the substrate/reimageable medium may have any suitable rigidity or flexibility depending on the intended use for the reimageable medium. In embodiments, the substrate/reimageable medium is capable of undergoing a number of cycles of being rolled up/folded and then unrolled/unfolded. The substrate/reimageable medium has any suitable size such as the dimensions of a business card, the dimensions of a sheet of paper (e.g., A4 and letter sized), or larger, and the like. The substrate/reimageable medium may have any suitable shape such as planar (e.g., a sheet) or non-planar (e.g., cube, scroll, and a curved shape). In embodiments, a plurality of reimageable mediums can also be combined to form a larger reimageable surface analogous to a giant display screen composed of a number of smaller display screens.

An illustrative method to make the reimageable medium is now discussed. The core/shell latex emulsion comprised of polymer particles containing photochromic material and light absorbing material generated from the emulsion polymerization is combined with other components to form a coating in a manner following the general formulation guidelines following: 100 parts core/shell latex dry weight basis, 10-50 parts binder latex dry weight basis where the binder is typically styrene acrylate latex with glass transition temperature in the range −10 to 30° C. these latexes comprise a class of paper coating binders well known to practitioners in the field of paper coatings, 1-5 parts rheology modifer which may be an alkali-swellable acrylate emulsion or an associative thickener material or a soluble polymer such as carboxy-methyl cellulose, and could include a number of additives such as lubricants, foam control agents, biocides, etc and which is typically pH adjusted to a value in the range 7-9, all following paper aqueous paper coating formulation guidelines well known to practitioners in the field. This coating is then applied to the substrate as a liquid film coating. Many coating techniques are available, including metering rod, air-knife, blade, knife-on-roll, slot die, forward and reverse roll, multi-roll, direct and offset gravure, spray, fountain and other well-known methods. After application of the liquid film coating to the intended substrate a variety of drying techniques, well known to practitioners of paper coating, can be used to remove the water resulting in the desired dry coating layer.

In other embodiments, the reimageable medium can be prepared without the need for a preformed substrate and the particle deposition step. In this case a plastic photochromic medium can be prepared according to the procedures and methods for the preparation of extruded films outlined in U.S. Pat. No. 6,596,407, the disclosure of which is totally incorporated herein by reference. In this case the, similar to U.S. Pat. No. 6,596,407 a polyethylene terephthalate resin along with other said particles and binders is extruded in the presence of the embodied photochromic particles stated herein to yield a polyester film. It should be noted that the extrusion conditions should be such that the resin materials are compatible with the core shell particles and the extrusion temperature is below that of the melt temperature of the particles shell to prevent loss of the core shell structure and loss of the embodied properties.

An advantage to this invention in embodiments is that it ensures that all the photochromic molecules are protected from ambient UV light within the core of the particle by the encompassing encapsulating shell which contains the light absorbing material. Previous to this, the light absorbing material and photochrome were dispersed together and coated which did not ensure adequate protection of the photochrome from ambient light, as the light absorbing material and photochrome are randomly dispersed throughout the matrix. The other alternative was a dual coating process by coating a thin film of the light adsorbing material over top of the photochromic material. This works adequately on smooth substrates, but is very problematic on rough paper-like substrates, as perfect thin coatings are difficult to achieve. Furthermore it requires an additional coating step, whereas the core-shell approach requires only one coating step of the preformed particles.

In its method aspects, the present disclosure involves providing a reimageable medium (also referred herein as "medium"), where the medium exhibits a reversible transition between a less colored state and a more colored state (also referred herein as a "different color" state). To provide in embodiments separate writing and erasing processes, imaging is conducted by applying a first stimulus, such as UV light irradiation, to the medium surface to cause a color change, and erasing is conducted by applying a second, different stimulus, such as UV or visible light irradiation, and optionally heat, to the medium to reverse the color change. In other embodiments, the erasing is conducted by applying both visible light and heat, or by applying heat alone. Thus, for example, the medium as a whole could be sensitive at a first (such as UV) wavelength that causes the photochromic material to convert from a less colored state to a more colored state, while the medium as a whole could be sensitive at a second, different (such as visible) wavelength and/or to heat that causes the photochromic material to convert from the more colored state back to the less colored state.

In embodiments, heating can be applied to the medium before or at the same time as the light irradiation, for either the writing and/or erasing processes. However, in embodiments, heating is not required for the writing process, as such stimuli as UV light irradiation are sufficient to cause the color change from less colored to more colored, while heating may be desired or required for the erasing process to speed up the color change from more colored to less colored. When used, the heat raises the temperature of the medium, particularly the photochromic material, to allow easier and faster conversion from one color state to the other. The heating can be applied before or during the irradiation, or by itself, as long as the heating causes the photochromic material to be raised to the desired temperature during the irradiation or erasing process. Any suitable heating temperature can be used, and will depend upon, for example, the specific photochromic material and binder used. For example, the heating can be conducted to raise the binder to at or near its glass transition temperature or melting point, such as within about 5° C., within about 10° C., or within about 20° C. of the glass transition temperature or melting point, although it is desired in certain embodiments that the temperature not exceed the melting point of the binder so as to avoid undesired movement or flow of the binder on the medium.

The different stimuli, such as different light irradiation wavelengths, can be suitably selected to provide distinct writing and erasing operations. For example, in one embodiment, the photochromic material is selected to be sensitive to UV light to cause isomerization from the less colored form to the more colored form, but to be sensitive to visible light to cause isomerization from the more colored form to the less colored form. In other embodiments, the writing and erasing wavelengths are separated by at least about 10 nm, such as at least about 20 nm, at least about 30 nm, at least about 40 nm, at least about 50 nm, or at least about 100 nm. Thus, for example, if the writing wavelength is at a wavelength of about 360 nm, then the erasing wavelength is desirably a wavelength of greater than about 400 nm, such as greater than about 500 nm. Of course, the relative separation of sensitization wavelengths can be dependent upon, for example, the relatively narrow wavelengths of the exposing apparatus.

In embodiments, the reimageable medium has an "erase-on-demand" capability. That is, the image is relatively stable for a period of time (e.g., up to one or two weeks or longer) in ambient conditions, long enough for the user to intentionally erase the image in order to create a new image on the reimageable medium. The present disclosure discusses herein embodiments of the reimageable medium (and particles containing the photochromic material) having the "erase-on-demand" capability, but it is understood that the present disclosure also encompasses "self-erasing" reimageable medium (and particles containing the photochromic material) where the image fades relatively quicker under ambient conditions (e.g., less than about 48 hours) without the use of any image erasing device. The choice of the photochromic material strongly influences whether the reimageable medium has the "erase-on-demand" capability or "self-erasing" capability.

In a writing process, the medium is exposed to an imaging light having an appropriate activating wavelength, such as a UV light source such as a light emitting diode (LED), in an imagewise fashion. The imaging light supplies sufficient energy to the photochromic material to cause the photochromic material to convert, such as isomerize, from a less colored form to a more colored form to produce a colored image at the imaging location, and for the photochromic material in embodiments to isomerize to stable isomer forms to lock in the image. The amount of energy irradiated on a particular location of the medium can affect the intensity or shade of color generated at that location. Thus, for example, a weaker intensity image can be formed by delivering a lesser amount of energy at the location and thus generating a lesser amount of the colored form of the photochromic material, while a stronger intensity image can be formed by delivering a greater amount of energy to the location and thus generating a greater amount of the colored form of the photochromic material. When suitable photochromic material, binder, light absorbing material, and irradiation conditions are selected, the variation in the amount of energy irradiated at a particular location of the medium can thus allow for formation of grayscale images, while selection of other suitable photochromic materials can allow for formation of full color images.

Once an image is formed by the writing process, the formation of stable isomer forms of the photochromic material locks in the image. That is, the isomer forms of the new photochromic materials are more stable to ambient heat and light, and thus exhibit greater long-term stability. The image is thereby "frozen" or locked in, and cannot be readily erased in the absence of a specific second stimuli. In embodiments, the image is locked in, and cannot be readily erased by ambient heat or light, and requires elevated temperature and or a light stimulus in order to revert back to the less colored state.

Thus, the medium exhibits a long-lived image lifetime, but which can be erased as desired and reused for additional imaging cycles, thereby providing an "erase-on-demand" capability.

In an erasing process, the writing process is essentially repeated, except that a different stimuli, such as a different wavelength irradiation light, such as visible light, is used, and/or when the photochromic material is optionally heated such as to a temperature at or near a glass transition, melting, or boiling point temperature of the binder. For example, the heating can be conducted at a temperature of from about 80 to about 250° C., such as from about 100 to about 200° C. or about 100 to about 160° C. The erasing process causes the isomerizations to reverse and the photochromic material to convert, such as isomerize, from a more colored form to a less colored form to erase the previously formed image at the imaging location. The erasing procedure can be on an imagewise fashion or on the entire imaging layer as a whole, as desired. The heating step is optional, in that certain compositions can be provided that are erased upon only exposure to the selected stimulus such as light wavelength, while other compositions can be provided that can be erased only under a heating condition, optionally upon exposure to the selected stimulus such as light wavelength.

The separate imaging lights used to form the transient image may have any suitable predetermined wavelength scope such as, for example, a single wavelength or a band of wavelengths. In various exemplary embodiments, the imaging light is an ultraviolet (UV) light having a single wavelength or a narrow band of wavelengths. For example, the UV light can be selected from the UV light wavelength range of about 200 nm to about 475 nm, such as a single wavelength at about 365 nm or a wavelength band of from about 360 nm to about 370 nm. For forming the image, the image forming medium may be exposed to the respective imaging light for a time period ranging from about 10 milliseconds to about 5 minutes, particularly from about 30 milliseconds to about 1 minute. The imaging light may have an intensity ranging from about 0.1 mW/cm$^2$ to about 100 mW/cm$^2$, particularly from about 0.5 mW/cm$^2$ to about 10 mW/cm$^2$.

The erasing light is strong visible light of a wavelength which overlaps with the absorption spectrum of the more colored state isomer in the visible region. For example the erasing useful light may have a wavelength ranging from about 400 nm to about 800 nm or more preferably form about 500 nm to about 800 nm. The usable visible light of the erasing may be obtained form a Xenon light source with a bulb having a power from 5 W to about 1000 W or more preferably from about 20 W to about 200 W, which is placed in the proximity of the areas of the medium which is to be erased. Another suitable erasing light source is an LED having a wavelength in the visible region of the light spectrum, as defined above. The erasing light may be having a single wavelength or a narrow band of wavelengths.

In various embodiments, imaging light corresponding to the predetermined image may be generated for example by a computer or a Light Emitting Diode (LED) array screen and the image is formed on the image forming medium by placing the medium on or in proximity to the LED screen for the desired period of time. In other embodiments, a UV Raster Output Scanner (ROS) may be used to generate the UV light in an image-wise pattern. This embodiment is particularly applicable, for example, to a printer device that can be driven by a computer to generate printed images in an otherwise conventional fashion. That is, the printer can generally correspond to a conventional inkjet printer, except that the inkjet printhead that ejects drops of ink in the imagewise fashion can be replaced by a suitable UV light printhead that exposes the image forming medium in an imagewise fashion. In this embodiment, the replacement of ink cartridges is rendered obsolete, as writing is conducted using a UV light source. The printer can also include a heating device, which can be used to apply heat to the imaging material to erase any existing images. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

For erasing an image in order to reuse the reimageable medium, in various embodiments, the medium can be exposed to a suitable imaging light, to cause the image to be erased. Such erasure can be conducted in any suitable manner, such as by exposing the entire medium surface to the erasing light at once, exposing the entire medium surface to the erasing light in a successive manner such as by scanning the medium, or the like. In other embodiments, erasing can be conducted at particular points on the medium, such as by using a light pen, or the like.

According to various embodiments, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. However, in terms of desired maximum color contrast, a desirable color contrast is a dark gray or black image on a light or white background, such as a gray, dark gray, or black image on a white background, or a gray, dark gray, or black image on a light gray background.

In various embodiments, the color contrast may change such as, for example, diminish during the visible time, but the phrase "color contrast" may encompass any degree of color contrast sufficient to render an image discernable to a user regardless of whether the color contrast changes or is constant during the visible time.

The invention will now be described in detail with respect to specific representative embodiments thereof, it being understood that these examples are intended to be illustrative only and the invention is not intended to be limited to the materials, conditions, or process parameters recited herein. All percentages and parts are by weight unless otherwise indicated.

EXAMPLE 1

Core-Single Shell Particle

A core/shell latex emulsion comprised of polymer particles containing photochromic material and light absorbing material generated from the emulsion polymerization was prepared as follows. An anionic surfactant solution consisting of 3 grams of Tayca anionic surfactant and 250 grams de-ionized water was mixed in a stainless steel holding tank to form the aqueous surfactant phase. The holding tank was then purged with nitrogen before transferring into the reactor. The reactor was then continuously purged with nitrogen while being stirred at 100 RPM. The reactor was then heated up to 80° C. at a controlled rate, and held there. Separately a solution of 1.05 grams ammonium persulfate initiator and de-ionized water was prepared. Separately a first monomer emulsion is prepared consisting of 31 grams methyl methacrylate, 1.75 grams Tayca anionic surfactant, 34 grams deionized water, and 3 grams of 3-(3,3,4,4,5,5-hexafluoro-2-(2-methoxy-5-phenylthiophen-3-yl)cyclopent-1-enyl)-2-methyl-5-phenylthiophene which was the photochromic material. A second "shell" monomer solution is prepared consisting of 31 grams methyl methacrylate, 1.75 grams Tayca anionic surfactant, 34 grams deionized water, and 3 grams Neptun Gelb 075 (from BASF, yellow dye). 10% by weight of the first monomer solution was slowly fed into the reactor containing the aqueous surfactant phase at 80° C. to form the "seeds" while being purged with nitrogen. The initiator solution was then slowly charged into the reactor and after 10 minutes the rest of the first monomer emulsion was continuously fed in a using metering pump at a rate of 0.5%/min. Once all the first monomer emulsion was charged into the main reactor, the second shell monomer emulsion was continuously fed in a using metering pump at a rate of 0.5%/min. Once all the second shell monomer emulsion was charged into the main reactor, the temperature was held at 80° C. for an additional 2 hours to complete the reaction. Full cooling is then applied and the reactor temperature is reduced to 35° C. The latex particles are then separately dried.

EXAMPLE 2

Core/Inner-Shell/Outer-Shell Particles

A core/inner-shell/outer-shell latex emulsion comprised of polymer particles containing photochromic material and light absorbing material generated from the emulsion polymerization is prepared as follows. An anionic surfactant solution consisting of 3 grams of Tayca anionic surfactant and 250 grams de-ionized water is mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of 1.05 grams ammonium persulfate initiator and de-ionized water is prepared. Separately a first monomer emulsion is prepared consisting of 31 grams methyl methacrylate, 1.75 grams Tayca anionic surfactant, and 34 grams deionized water. A second "inner shell" monomer solution is prepared consisting of 15 grams methyl methacrylate, 0.9 grams of Tayca anionic surfactant, 17 grams of deionized water, and a 3 grams of 3-(3,3,4,4,5,5-hexafluoro-2-(2-methoxy-5-phenylthiophen-3-yl)cyclopent-1-enyl)-2-methyl-5-phenylthiophene. A third "outer shell" monomer solution is prepared consisting of 15 grams methyl methacrylate, 0.9 grams Tayca anionic surfactant, 17 grams of deionized water, and 3 grams Neptun Gelb 075 (from BASF). 10% by weight of the first monomer solution is slowly fed into the reactor containing the aqueous surfactant phase at 80° C. to form the "seeds" while being purged with nitrogen. The initiator solution is then slowly charged into the reactor and after 10 minutes the rest of the first monomer emulsion is continuously fed in a using metering pump at a rate of 0.5%/min. Once all the first monomer emulsion is charged into the main reactor, the second "inner shell" monomer emulsion is continuously fed in a using metering pump at a rate of 0.5%/min. Once all the second "inner shell" monomer emulsion is charged into the main reactor, the third "outer shell" monomer emulsion is continuously fed in a using metering pump at a rate of 0.5%/min. Once all the third "outer shell" monomer emulsion is charged into the main reactor the temperature is held at 80° C. for an additional 2 hours to complete the reaction. Full cooling is then applied and the reactor temperature is reduced to 35° C. The latex particles are then separately dried.

EXAMPLE 3

Particles (No Core/Shell Configuration where Photochromic Material and Light Absorbing Material are Dispersed in Particles)

A latex emulsion comprised of polymer particles containing photochromic material and light absorbing material generated from the emulsion polymerization is prepared as follows. An anionic surfactant solution consisting of 3 grams of Tayca anionic surfactant and 250 grams de-ionized water is mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of 1.05 grams ammonium persulfate initiator and de-ionized water is prepared. Separately a monomer emulsion is prepared consisting of 64 grams methyl methacrylate, 3.5 grams Tayca anionic surfactant, 68 grams deionized water, 3 grams of 3-(3,3,4,4,5,5-hexafluoro-2-(2-methoxy-5-phenylthiophen-3-yl)cyclopent-1-enyl)-2-methyl-5-phenylthiophene, and 3 grams Neptun Gelb 075 (from BASF). 10% by weight of the monomer solution is slowly fed into the reactor containing the aqueous surfactant phase at 80° C. to form the "seeds" while being purged with nitrogen. The initiator solution is then slowly charged into the reactor and after 10 minutes the rest of the monomer emulsion is continuously fed in a using metering pump at a rate of 0.5%/min. Once all the monomer emulsion is charged into the main reactor, the temperature is held at 80° C. for an additional 2 hours to complete the reaction. Full cooling is then applied and the reactor temperature is reduced to 35° C. The latex particles are then separately dried.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:
1. A plurality of particles comprising:
 a photochromic material disposed in a first binder and capable of reversibly converting among a less colored form and a more colored form in response to a predetermined wavelength scope; and
 a light absorbing material disposed in a second binder, wherein, at the predetermined wavelength scope, light absorption by the light absorbing material is less than about 50% of the light absorption by the less colored form of the photochromic material,
 wherein if the first binder is different than the second binder the particles comprise a core and a shell, the photochromic material being present in the core and the light absorbing material being present in the shell.
2. The particles of claim 1, wherein the particles range in size from 30nm to about 400 nm.
3. The particles of claim 1, wherein the light absorbing material comprises a yellow colorant.

4. The particles of claim 1, wherein the particles comprise a core and a shell.

5. The particles of claim 4, wherein the shell is a single shell and the photochromic material is present in the core and the light absorbing material is present in the single shell.

6. The particles of claim 5, wherein the single shell thickness is about 10% to about 95% of the particle radius.

7. The particles of claim 4, wherein the shell is a single shell and the photochromic material is present in the core from about 2 to about 30 wt % and the light absorbing material is present in the single shell from about 2 to about 30 wt %.

8. The particles of claim 4, wherein the shell comprises an outer shell and an inner shell, wherein the photochromic material is present in the core or the inner shell, or in both the core and the inner shell, and the light absorbing material is present in the outer shell.

9. The particles of claim 8, wherein the outer shell and inner shell thickness combined is about 10% to about 95% of the particle radius.

10. The particles of claim 8, wherein the shell comprises an outer shell and an inner shell, wherein the photochromic material is present in the inner shell from about 2 to about 30 wt % and the light absorbing material is present in the outer shell from about 2 to about 10 wt %.

11. The particles of claim 1, wherein the first binder and the second binder are same or different.

12. A reimageable medium comprising:
   a plurality of particles, each of the plurality of particles comprising:
      a photochromic material disposed in a first binder and capable of reversibly converting among a less colored form and a more colored form in response to a predetermined wavelength scope; and
      a light absorbing material disposed in a second binder, wherein, at the predetermined wavelength scope, light absorption by the light absorbing material is less than about 50% of the light absorption by the less colored form of the photochromic material and wherein the first binder and the second binder are the same or different,
   wherein if the first binder is different than the second binder, the particles comprise a core and a shell, the photochromic material being present in the core and the light absorbing material being present in the shell.

13. The medium of claim 12, further comprising a substrate.

14. The medium of claim 12, further comprising a film including the particles and a film-forming binder wherein a separate substrate is absent from the medium.

15. The medium of claim 12, wherein the light absorbing material comprises a yellow colorant.

16. The medium of claim 12, wherein the particles comprise a core and a shell.

17. The medium of claim 16, wherein the shell is a single shell and the photochromic material is present in the core and the light absorbing material is present in the single shell.

18. A reimageable medium comprising:
   a plurality of particles, each of the plurality of particles comprising:
      a core comprising a first binder and a photochromic material capable of reversibly converting among a less colored form and a more colored form, wherein the less colored form has a light absorption band A that overlaps with a predetermined wavelength scope; and
      a shell disposed over the core, the shell comprising a second binder and a light absorbing material exhibiting a light absorption band B that overlaps with the light absorption band A, wherein at the predetermined wavelength scope, light absorption by the light absorbing material is less than about 50% of the light absorption by the less colored form of the photochromic material and wherein the first binder and the second binder are the same or different.

19. The reimageable medium of claim 18, wherein at the predetermined wavelength scope, light absorption by the light absorbing material is in a valley of the light absorption spectrum of the light absorbing material.

20. The reimageable medium of claim 18, wherein the less colored form is colorless and the light absorbing material comprises a yellow colorant.

\* \* \* \* \*